United States Patent
Choi et al.

(10) Patent No.: US 9,383,842 B2
(45) Date of Patent: Jul. 5, 2016

(54) TOUCH SENSOR MODULE AND METHOD OF MANUFACTURING THE SAME

(71) Applicant: SAMSUNG ELECTRO-MECHANICS CO., LTD., Suwon-Si (KR)

(72) Inventors: Young An Choi, Suwon-Si (KR); Kyoung Soo Chae, Suwon-si (KR); Gwan Ha Jeong, Suwon-si (KR); Ji Soo Lee, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 91 days.

(21) Appl. No.: 14/452,519

(22) Filed: Aug. 5, 2014

(65) Prior Publication Data
US 2015/0042906 A1 Feb. 12, 2015

(30) Foreign Application Priority Data
Aug. 7, 2013 (KR) .................. 10-2013-0093781

(51) Int. Cl.
G06F 3/041 (2006.01)
B32B 37/12 (2006.01)
B32B 38/00 (2006.01)

(52) U.S. Cl.
CPC ............... *G06F 3/041* (2013.01); *B32B 37/12* (2013.01); *B32B 38/145* (2013.01); *B32B 2038/0076* (2013.01); *B32B 2305/72* (2013.01); *B32B 2307/412* (2013.01); *B32B 2457/208* (2013.01)

(58) Field of Classification Search
CPC .......... G06F 3/044; G06F 2203/04103; G06F 3/041; G06F 3/0416; G06F 3/045; G06F 2203/04112; G06F 3/0412; G06F 2203/04111; G06F 3/0418
See application file for complete search history.

(56) References Cited

U.S. PATENT DOCUMENTS

| | | | |
|---|---|---|---|
| 2011/0148800 A1* | 6/2011 | Nishikawa | B32B 7/12 345/173 |
| 2012/0062478 A1* | 3/2012 | Kim | G06F 3/045 345/173 |
| 2014/0176506 A1* | 6/2014 | Park | G06F 3/042 345/176 |

FOREIGN PATENT DOCUMENTS

KR 1020120065740 A 6/2012

* cited by examiner

*Primary Examiner* — Gerald Johnson
(74) *Attorney, Agent, or Firm* — NSIP Law

(57) ABSTRACT

Disclosed herein is a touch sensor module, including: a window substrate; a touch sensor formed to face the window substrate and having an electrode pattern on a surface; an adhesive layer coupling the window substrate with the touch sensor; and a first moisture prevention layer formed along an outer edge of the touch sensor.

15 Claims, 6 Drawing Sheets

TOUCH SENSOR MODULE AND METHOD OF MANUFACTURING THE SAME

CROSS REFERENCE TO RELATED APPLICATION

This application claims the benefit of Korean Patent Application No. 10-2013-0093781, filed on Aug. 7, 2013, entitled "Touch Sensor Module and Manufacturing Method thereof," which is hereby incorporated by reference in its entirety into this application.

BACKGROUND OF THE INVENTION

1. Technical Field

The present invention relates to a touch sensor module and a method of manufacturing the same.

2. Description of the Related Art

In accordance with the growth of computers using digital technologies, devices assisting computers have also been developed, and personal computers, portable transmitters and other personal information processors execute processing of text and graphics using a variety of input devices such as a keyboard and a mouse.

Consequently, the use of computers is ever-increasing due to rapid transition into an information-oriented society. However, existing keyboards and mouse currently serving as input devices have limits to efficiently operate products. Therefore, required is a device that is simple, less likely to be miss-operated, and easy for everyone to input information.

In addition, techniques for input devices are evolving from a level of realizing general functions into a level considering high reliability, durability, innovation, designing and processing. To this end, a touch sensor has been developed as an input device capable of inputting information such as text and graphics.

Such a touch sensor is mounted on a display surface of a display such as an electronic organizer, a flat panel display device including a liquid crystal display (LCD) device, a plasma display panel (PDP), an electroluminescence (El) element or the like, or a cathode ray tube (CRT), so as for a user to select desired information while viewing the display.

In addition, types of the touch sensor include a resistive type touch panel, a capacitive type touch panel, an electromagnetic type touch panel, a surface acoustic wave (SAW) type touch panel, and an infrared type touch panel. These various types of touch panels are employed by electronic products depending on factors such as signal amplification, resolution differences, difficulty of designing and processing, optical properties, electrical properties, mechanical properties, resistance to an environment, input characteristics, durability, and economic efficiency. Currently, the resistive type touch panel and the capacitive type touch panel are most commonly used.

Touch sensor modules including touch sensors according to the prior art have a problem in that moisture becomes introduced between the bonded surfaces such that they have environmental resistance and moisture resistance properties that are vulnerable to high-temperature and humidity environment. Patent Document, Korean Patent Laid-open Publication No. 2012-0065740, teaches adding an additional adhesive layer in order to improve moisture-resistance property of the touch sensor module. However, adding the additional adhesive layer decreases productivity and reliability of the touch sensor module.

PRIOR ART DOCUMENT

Patent Document (Patent Document 1) Korean Patent Laid-Open Publication No. 2012-0065740

SUMMARY OF THE INVENTION

The present invention has been made in an effort to provide a touch sensor module ensuring environmental-resistance property in high-temperature and humidity environment and operation reliability by way of preventing introduction of moisture into the touch sensor module, and a method of manufacturing the same.

According to a first preferred embodiment of the present invention, there is provided a touch sensor module, including: a touch sensor, a window substrate; a touch sensor formed to face the window substrate and having an electrode pattern on a surface; an adhesive layer coupling the window substrate with the touch sensor; and a first moisture prevention layer formed along an outer edge of the touch sensor.

The touch sensor may include: a base substrate; a first electrode pattern formed on one surface of the base substrate; and a second electrode pattern formed on the other surface of the base substrate.

The first moisture prevention layer may be formed of the same material with the adhesive layer coupling the window substrate and the touch sensor.

The first moisture prevention layer may be formed of an acryl-based material.

The touch sensor module may further include a second moisture prevention layer covering the surface of the first moisture prevention layer.

The second moisture prevention layer may be formed of a material different from that of the first moisture prevention layer.

According to a second preferred embodiment of the present invention, there is provided a touch sensor module, including: a touch sensor disposed and formed to face the window substrate and having an electrode pattern on one surface, the touch sensor having a prevention groove to prevent moisture from being introduced into the electrode pattern; an adhesive layer inserted into the prevention groove and coupling the window substrate with the touch sensor; and a first moisture prevention layer formed along an outer edge of the touch sensor.

The first moisture prevention layer may be formed of the same material with the adhesive layer coupling the window substrate and the touch sensor.

The first moisture prevention layer may be formed of an acryl-based material.

The touch sensor module may further include a second moisture prevention layer covering the surface of the first moisture prevention layer.

The second moisture prevention layer may be formed of a material different from that of the first moisture prevention layer.

According to another preferred embodiment of the present invention, there is provided a method of manufacturing a touch sensor module, the method including: preparing a base substrate; forming a first electrode pattern on one surface of the base substrate and forming a second electrode pattern on the other surface of the base substrate; forming a first transparent adhesive layer on the first electrode pattern and forming a second transparent adhesive layer on the second electrode pattern; forming a first moisture prevention layer with an adhesive solution leaked out as the first electrode pattern are coupled with the window substrate; curing the first moisture prevention layer.

The method may further include after the attaching of the window substrate on the first transparent adhesive, attaching a hard-coating layer or an anti-reflection layer on the second transparent adhesive layer.

The method may further include, after the forming of the first moisture prevention layer, forming a second moisture prevention layer over the first moisture prevention layer.

In the forming of the second moisture prevention layer, the second moisture prevention layer may be formed of a different material from the first moisture prevention layer.

In the attaching of the window substrate on the first transparent adhesive layer, the first transparent adhesive layer may be formed of optical clear adhesive (OCA).

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
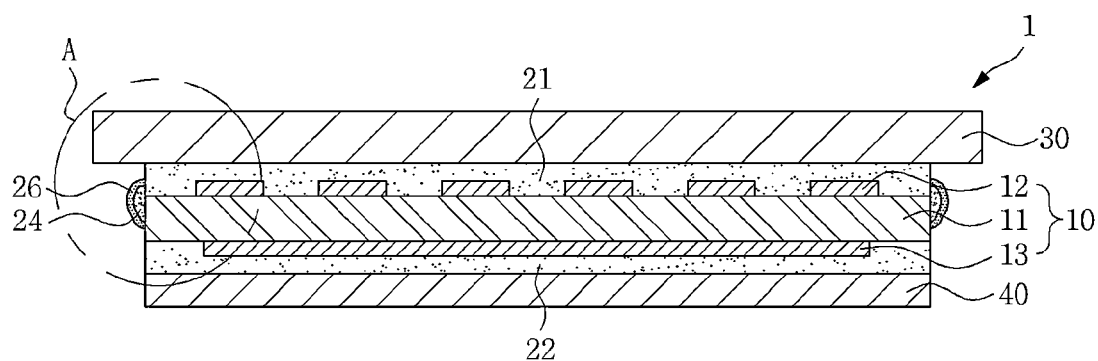
FIG. 1 is a perspective view schematically showing an adhesive layer in a touch sensor according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted.

Further, in the following description, the terms "first," "second," "one side," "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
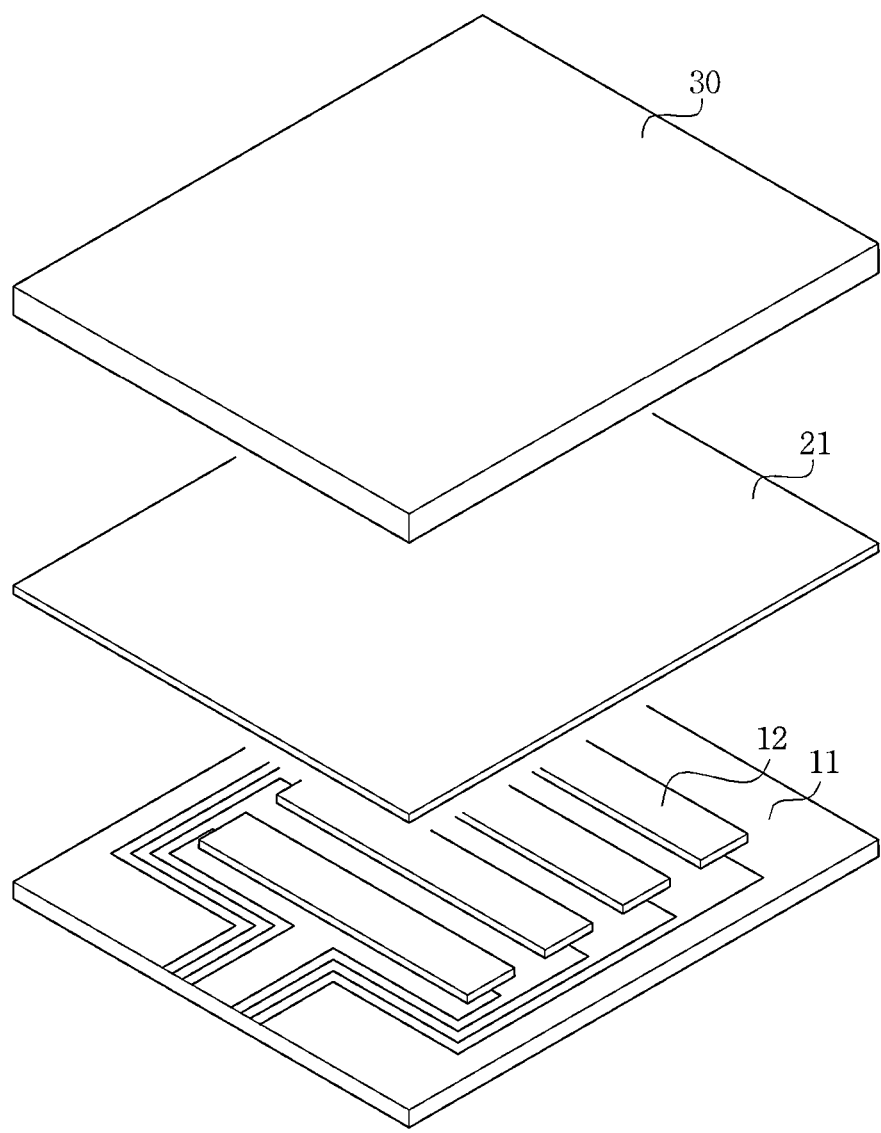
FIG. 2 is a cross-sectional view of a touch sensor module according to a preferred embodiment of the present invention.
Figure 3:
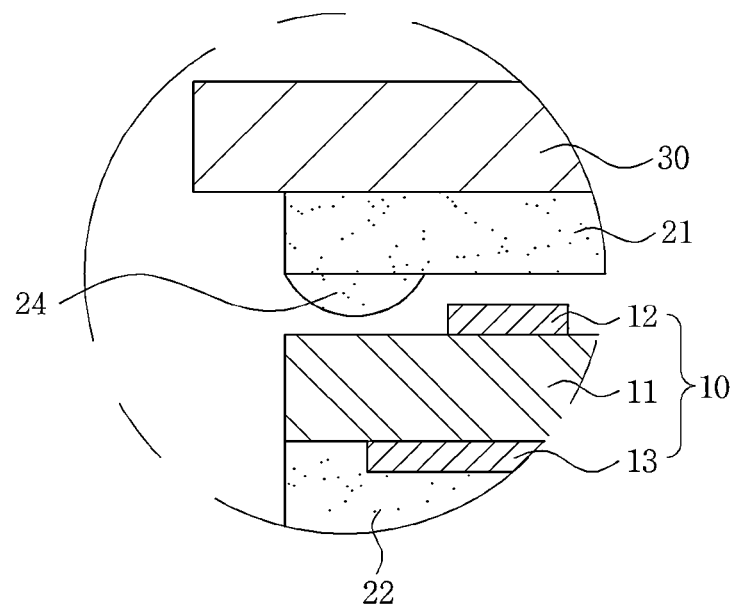
FIGS. 3 and 4 are enlarged views of part A of FIG. 1.
Figure 4:
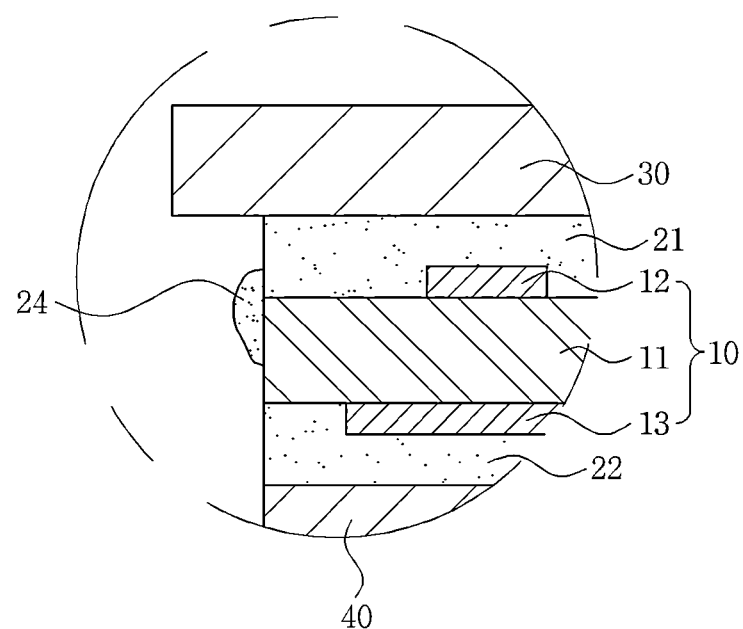

FIG. 1 is a perspective view schematically showing an adhesive layer in a touch sensor according to a preferred embodiment of the present invention; FIG. 2 is a cross-sectional view of a touch sensor module according to a preferred embodiment of the present invention; FIGS. 3 and 4 are enlarged views of part A of FIG. 1; FIGS. 5 to 8 are views of a touch sensor according to a variant example; and FIGS. 9 to 12 are views for illustrating a manufacturing process of a touch sensor module according to a preferred embodiment of the present invention.

The present invention relates to a touch sensor module 1 which has improved environmental resistance properties including a moisture resistance property by way of minimizing introduction of moisture into the touch sensor module 1. Accordingly, the touch sensor module 1 may maintain operation reliability even in a high-temperature and humidity environment, and thus users' convenience is improved and applications thereof may be diversified.

Referring to FIGS. 1 and 2, a touch sensor module according to a preferred embodiment includes a window substrate 30, a touch sensor 10 facing the window substrate 30 and having electrode patterns 12 and 13 on a surface, an adhesive layer 21 coupling the window substrate 30 and the touch sensor 10, and a first moisture prevention layer 24 formed along the outer edge of the touch sensor 10.

The window substrate 30 may provide a region in which the electrode patterns 12 and 13 are formed for detecting a touch location. The window substrate 30 needs to have support force for supporting the electrode patterns 12 and 13 and transparency for allowing a user to see through an image presented on a display.

The window substrate 30 is formed at the outermost side of the touch sensor 10 in the direction in which a user's touch is input, and is made of tempered glass having a predetermined strength or more such that it may also serve as a protective layer to protect the touch sensor 10. Taking into account the support force and transparency discussed above, the window substrate 30 may be made of polyethyleneterephthalate (PET), polycarbonate (PC), polymethylmethacrylate (PMMA), polyethylenenaphthalate (PEN), polyethersulfone (PES), cyclic olefin copolymer (COC), triacetylcellulose (TAC) film, polyvinyl alcohol (PVA) film, polyimide (PI) film, polystyrene (PS), biaxially oriented polystyrene (BOPS; containing K resin).

In the present invention, the shape and type of the touch sensor 10 are not specifically limited and, resistive or capacitive, or any other types of touch sensor 10 may be used. However, in a touch sensor module 1 according to a preferred embodiment of the present invention, a capacitive type touch sensor 10 having electrode patterns 12 and 13 formed on both surfaces of a base substrate 11 will be described, for example.

As shown in FIG. 2, the touch sensor 10 in the touch sensor module 1 according to the preferred embodiment of the present invention includes a base substrate 11, a first electrode pattern 12 formed on one surface of the base substrate 11, and a second electrode pattern 13 formed on the other surface of the base substrate 11.

The material of the base substrate 11 is not specifically limited as long as it has a predetermined strength or more, but preferably may be made of polyethylene terephthalate (PET), polycarbonate (PC), poly methyl methacrylate (PMMA), polyethylene naphthalate (PEN), polyethersulfone (PES), cyclic olefin polymer (COC), triacetylcellulose (TAC) film, polyvinyl alcohol (PVA) film, polyimide (PI) film, polystyrene (PS), biaxially stretched polystyrene (K resin containing biaxially oriented PS; BOPS), glass, or tempered glass, but is not necessarily limited thereto. In addition, electrode patterns 12 and 13 to be described below may be formed on the base substrate 11, in order to increase the adhesive force between the base substrate 11 and the electrode patterns 12 and 13, a surface finish layer may be formed on one surface of the base substrate 11 by performing high-frequency or primer treatment thereon.

The electrode patterns 12 and 13 generates a signal when an input unit is touched and allows a control unit (not shown) to identify touch coordinates. The first electrode pattern 12 and the second electrode pattern 13 may intersect each other.

For example, if at least one first electrode pattern 12 is formed in parallel to the x-axis direction, the second electrode pattern 13 may be formed in parallel to the y-axis direction so as to intersect the first electrode pattern 12, to form one or more electrode patterns 12 and 13. By doing so, the coordinate of the point touched by a user may be identified by the first electrode pattern 12 and the second electrode pattern 13, and the touch sensor may be driven. In the present invention, the material of the first and second electrode patterns 12 and 13 are not specifically limited as long as it is conductive.

The electrode patterns 12 and 13 may be formed in a mesh pattern using copper (Cu), aluminum (Al), gold (Au), silver (Ag), titanium (Ti), palladium (Pd), chromium (Cr) or nickel (Ni), or a combination thereof. Especially, the mesh pattern may be formed by arranging more than one unit patterns 20a in succession. Here, the unit patterns 20a may have a quadrangular shape, a triangular shape, a diamond shape and any other various shapes.

In addition to those discussed above, the electrode patterns 12 and 13 may also be formed using metal silver formed by exposing/developing silver salt emulsion layer, a metal oxide such as an indium thin oxide (ITO), a conductive polymer such as poly-3, 4-ethylenedioxythiophene/polystyrenesulfonate (PEDOT/PSS), which has excellent flexibility and is simply coated.

The touch sensor 10 may have a first transparent adhesive layer 21 on one surface and a second transparent adhesive layer 22 on the other surface. The first transparent adhesive layer 21 and the second transparent adhesive layer 22 formed on respective surfaces of the touch sensor 10 serve to bond the window substrate 30 above the touch sensor 10 and couple the hard coating layer 40 under the touch sensor 10 or the antireflection layer, to bond a display unit.

The first and second transparent adhesive layers 21 and 22 may be formed of optical clear adhesive (OCA), acryl based or epoxy based material. Although the material for the first and second transparent adhesive layers 21 and 22 is not specifically limited, a transparent material is desired for visibility of the touch sensor module 1.

In the touch sensor module 1 coupled by the first and second transparent adhesive layers 21 and 22 has problem in that moisture becomes introduced from the outside through the boundary between the first and second transparent adhesive layers 21 and 22.

Accordingly, in order to prevent moisture from being introduced through the boundary between the first transparent adhesive layers 21 and the base substrate 11, a first moisture prevention layer 24 is formed.

Referring to FIGS. 3 and 4, the first moisture prevention layer 24 is formed in a manner that an adhesive solution leaks out by the pressure generated when the first transparent adhesive layer 21 is coupled with the window substrate 30. The first moisture prevention layer 24 leaks out from the boundary between the base substrate 11 and the first transparent adhesive layer 21, is pulled down by gravity, and is cured. In other words, the first moisture prevention layer 24 preferably has a droplet shape by gravity.

The first moisture prevention layer 24 covers the boundary between the base substrate 11 and the first transparent adhesive layer 21. The first moisture prevention layer 24 is created when the first transparent adhesive layer 21 is excessively applied onto the base substrate 11 to be coupled with it.

The first moisture prevention layer 24 is formed along the boundary of the first transparent adhesive layer 21. The first moisture prevention layer 24 is formed of optical clear adhesive (OCA), acryl based or epoxy based material. Preferably, the first moisture prevention layer 24 is formed of the same material with the first transparent adhesive layer 21. This is to manufacture the touch sensor module 1 without newly adding a separate process for forming the first moisture prevention layer 24.

Figure 5:
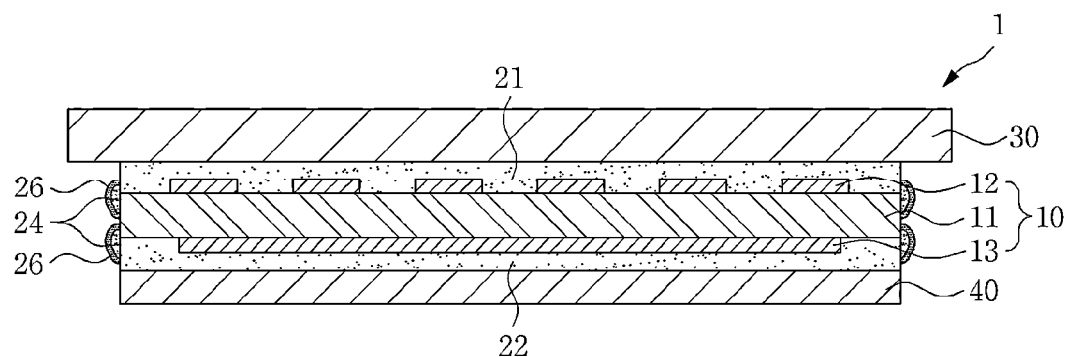
FIGS. 5 to 8 are views of a touch sensor according to a variant example.

In some cases, as shown in FIG. 5 the first moisture prevention layer 24 may be formed at each of the boundaries of the first and second transparent adhesive layers 21 and 22 formed along the outer edges. Preferably, the first transparent adhesive layer 21 and the second transparent adhesive layer 22 are formed of the same material. In addition, over the outer surface of the first moisture prevention layer 24, a second moisture prevention layer 26 of material different from the first moisture prevention layer 24 is formed. The second moisture prevention layer 26 is formed of a material different from that of the first moisture prevention layer 24 so as to enhance moisture prevention. Preferably, the second moisture prevention layer 26 is formed of optical clear adhesive (OCA), acryl based or epoxy based material.

Figure 6:
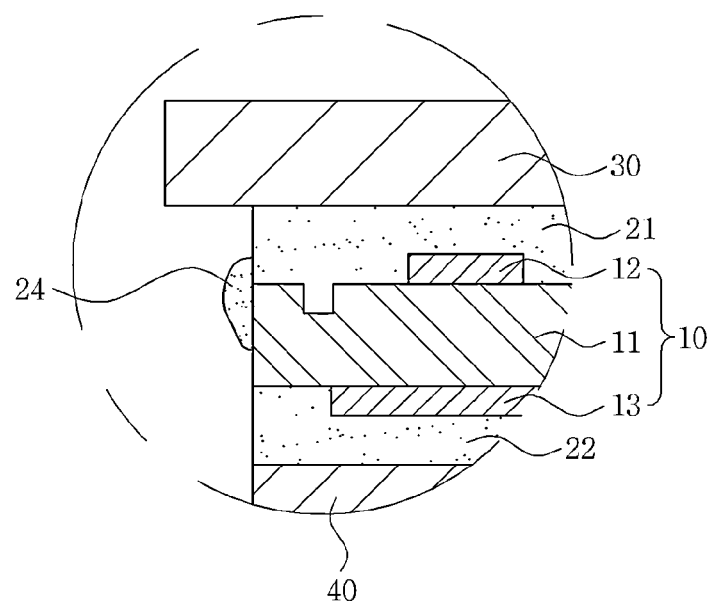

Referring to FIG. 6, a touch sensor module 1 according to a first variant example of the present invention will be described focusing on the structure of the touch sensor module 1 which is different from the counterpart in the preferred embodiment, and the same elements with the elements of the preferred embodiment will not be described. Descriptions on the window substrate 30, the electrode patterns 12 and 13, the first transparent adhesive layer 21 and the second transparent adhesive layer 22, which are identical to those in the preferred embodiment, will be omitted.

A touch sensor module 1 according to the first variant example includes a window substrate 30, a touch sensor 10 facing the window substrate 30 and having electrode patterns 12 on one surface, an adhesive layer coupling the window substrate 30 and the touch sensor 10, and a first moisture prevention layer 24 formed along the edge of the touch sensor 10.

The touch sensor 10 may include the first electrode pattern 12 formed on one surface of the base substrate 11; and the second electrode pattern 13 formed on the other surface of the base substrate 11. The base substrate 11 has a prevention groove formed along the edge which is in contact with the first transparent adhesive layer 21. The prevention groove formed on the base substrate 11 may be formed using laser and mechanical drilling.

Figure 7:
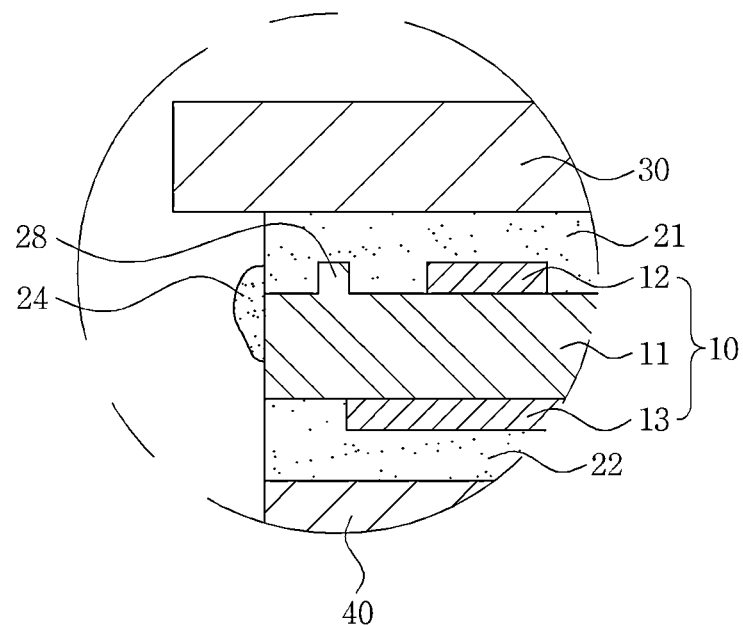

The prevention groove is filled with the adhesive solution of the first transparent adhesive layer 21. That is, the prevention groove blocks the moisture introducing through the boundary between the first transparent adhesive layer 21 and the base substrate 11. Referring to FIG. 7, a touch sensor module 1 according to a second variant example of the present invention will be described focusing on the structure different from the first variant example. Descriptions on the window substrate 30, the electrode patterns 12 and 13, the first transparent adhesive layer 21 and the second transparent adhesive layer 22, which are identical to those in the preferred embodiment, will be omitted.

A touch sensor module 1 according to the second variant example includes a window substrate 30, a touch sensor 10 facing the window substrate 30 and having electrode patterns 12 on one surface, an adhesive layer coupling the window substrate 30 and the touch sensor 10, and a first moisture prevention layer 24 formed along the edge of the touch sensor 10.

The touch sensor 10 may include the first electrode pattern 12 formed on one surface of the base substrate 11; and the second electrode pattern 13 formed on the other surface of the base substrate 11. The base substrate 11 has a projection 28 in the thickness direction of the window substrate 30. The projection 28 is formed along the edge of the base substrate 11. The projection 28 is formed to protrude from the surface of the base substrate 11. The projection 28 blocks the moisture from being introduced through the boundary between the first transparent adhesive layer 21 and the base substrate 11. Preferably, the projection 28 has as large contacting area as possible in order to block the moisture from being introduced. This retards introduction of the moisture into the touch sensor module 1 together with the first moisture prevention layer 24 formed on the boundary between the first transparent adhesive layer 21 and the base substrate 11.

Figure 8:
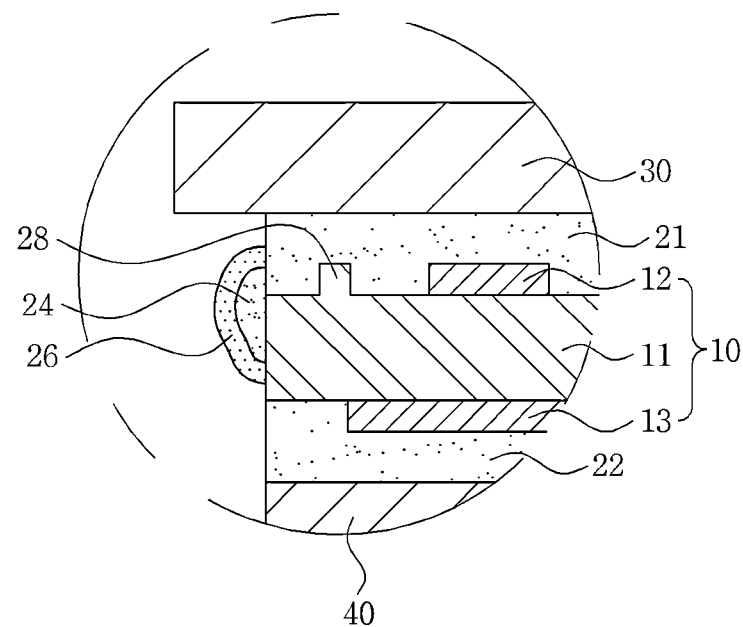

In some cases, as shown in FIG. 8, the surface of the first moisture prevention layer 24 is applied by a second moisture prevention layer 26 so as to block the moisture from being introduced through the boundary.

Figure 9:
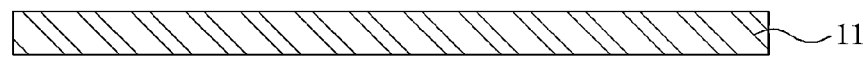
FIGS. 9 to 12 are views for illustrating a manufacturing process of a touch sensor module according to a preferred embodiment.

FIG. 9 is a view showing preparing the base substrate 11. Preferably, the base substrate 11 may be formed of a transparent material for visibility of the touch sensor module 1. The material of the base substrate 11 has been described with reference to the touch sensor module 1 according to the preferred embodiment and the description will not be repeated.

Figure 10:
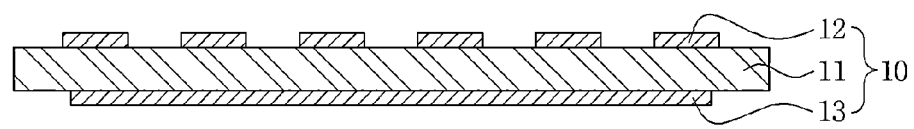

FIG. 10 is a view showing forming the first and second electrode patterns 12 and 13 on both surfaces of the base substrate 11. Here, the first and second electrode patterns 12 and 13 may be formed by dry etching, wet etching or a direct patterning process. Here, the dry etching includes sputtering, evaporation or the like, the wet etching includes dip coating, spin coating, roll coating, spray coating or the like, and, the direct patterning process may be formed by screen printing, gravure printing, inkjet printing or the like.

Figure 11:
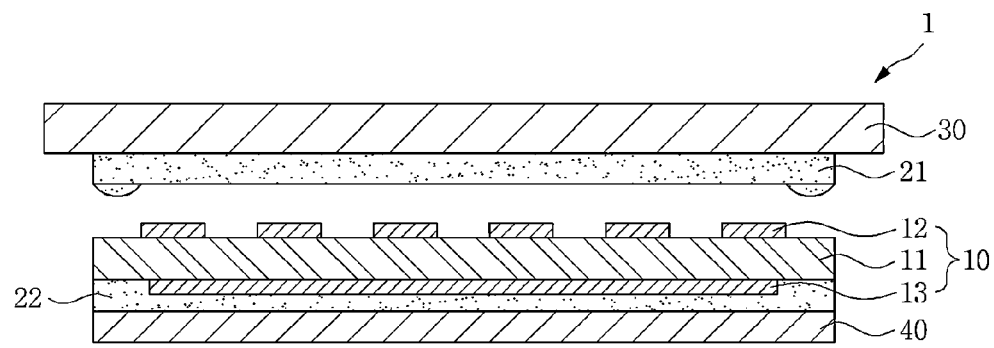
Figure 12:
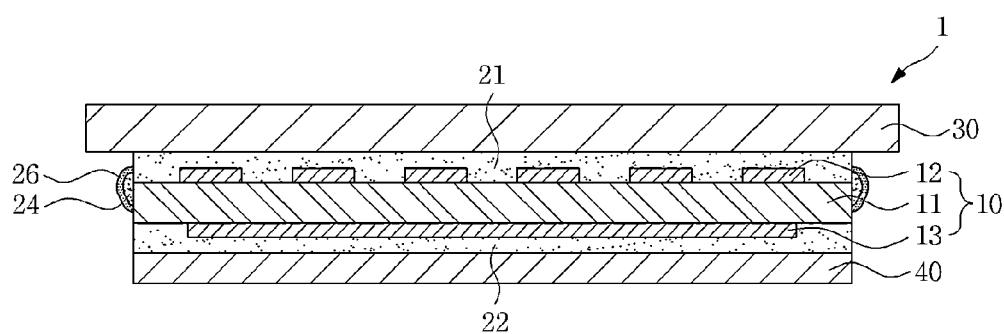

FIGS. 11 and 12 show forming the first and second transparent adhesive layers 21 and 22, and forming the first moisture prevention layer 24 by coupling the first electrode pattern 12 with the window substrate 30 so as to leak out an adhesive solution, respectively. As described above, the first transparent adhesive layer 21 is formed on the first electrode pattern 12, and the second transparent adhesive layer 22 is formed on the second electrode pattern 13. The first and second transparent adhesive layers 21 and 22 may be formed of optical clear adhesive (OCA). Although the material for the first and second transparent adhesive layers 21 and 22 is not specifically limited, a transparent material is desired for visibility of the touch sensor module 1.

The window substrate 30 is bonded on the first transparent layer 21 so that the rigidity of the touch sensor module 1 is maintained. Especially, since the first electrode pattern 12 is exposed, the window substrate 30 is bonded to protect the first electrode pattern 12, thereby easily ensuring operation reliability of the touch sensor 10.

The first transparent adhesive layer 21 is coupled with the base substrate 11. The adhesive solution leaks out from along the boundary between the base substrate 11 and the first transparent adhesive layer 21. The leaked adhesive solution is partially cured by irradiating with ultraviolet ray, to form the first moisture prevention layer 24 to block introduction of moisture. Especially, in the case of optical clear adhesive material (OCA), it is cured to have denser structure to form the first prevention layer 24 at the boundary, the introduction of the moisture may be more easily blocked. In addition, the second moisture prevention layer 26 is formed over the first moisture prevention layer, thereby preventing the introduction of the moisture.

Further, by forming a hard-coating layer 40 or an anti-reflection layer on the second transparent adhesive layer 22, the hard-coating layer 40 also serves to protect a portion including the second electrode pattern 13. The anti-reflection layer may be provided for improving visibility of the touch sensor module 1. Although not shown, an image output device (not shown) of a display unit may be disposed on the second transparent adhesive layer 22.

Description on other elements which are identical to the elements of the touch sensor module 1 according to the preferred embodiment will be omitted.

According to the present invention, operation reliability of a touch sensor module can be ensured by ensuring environmental-resistance property in high-temperature and humidity environment.

Further, according to the present invention, environmental resistance property of a touch sensor module can be effectively ensured without a separate process or member by way of forming a first moisture prevention layer for preventing moisture from being introduced into boundary between a window substrate and a base substrate, so as to ensure environmental resistance property at bonded portions.

In addition, according to the present invention, a first moisture prevention layer is formed at the boundary used in a touch module to block introduction of moisture, so that it does not result in deterioration in coupling reliability and performance which may be caused in a case that an additional element is added.

Moreover, the effect of preventing moisture can be magnified by forming the first moisture prevention layer with a material different from the second moisture prevention layer.

Finally, a first moisture prevention layer can be formed by excessively applying a first transparent layer without adding any process to existing processes.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:
1. A touch sensor module, comprising:
   a window substrate;
   a touch sensor formed to face the window substrate;
   an adhesive layer coupling the window substrate with the touch sensor; and
   a first moisture prevention layer formed along an outer edge of the touch sensor,
   wherein the first moisture prevention layer is formed of the same material with the adhesive layer coupling the window substrate and the touch sensor.
2. The touch sensor module as set forth in claim 1, wherein the touch sensor includes: a base substrate; a first electrode pattern formed on one surface of the base substrate; and a second electrode pattern formed on the other surface of the base substrate.
3. The touch sensor module as set forth in claim 1, wherein the first moisture prevention layer is formed of optical clear adhesive (OCA), acryl based or epoxy based material.
4. The touch sensor module as set forth in claim 1, further comprising a second moisture prevention layer covering the outer surface of the first moisture prevention layer.
5. The touch sensor module as set forth in claim 4, wherein the second moisture prevention layer is formed of different material from the first moisture prevention layer.
6. A touch sensor module, comprising:
   a window substrate;

a touch sensor disposed and formed to face the window substrate and having an electrode pattern on one surface, the touch sensor having a prevention groove to prevent moisture from being introduced into the electrode pattern;

an adhesive layer inserted into the prevention groove and coupling the window substrate with the touch sensor; and a first moisture prevention layer formed along an outer edge of the touch sensor.

7. The touch sensor module as set forth in claim 6, wherein the first moisture prevention layer is formed of the same material with the adhesive layer coupling the window substrate and the touch sensor.

8. The touch sensor module as set forth in claim 7, wherein the first moisture prevention layer is formed of optical clear adhesive (OCA), acryl based or epoxy based material.

9. The touch sensor module as set forth in claim 6, further comprising a second moisture prevention layer covering the outer surface of the first moisture prevention layer.

10. The touch sensor module as set forth in claim 9, wherein the second moisture prevention layer is formed of different material from the first moisture prevention layer.

11. A method of manufacturing a touch sensor module, the method comprising:

preparing a base substrate;

forming a first electrode pattern on one surface of the base substrate and forming a second electrode pattern on the other surface of the base substrate;

forming a first transparent adhesive layer on the first electrode pattern and forming a second transparent adhesive layer on the second electrode pattern;

forming a first moisture prevention layer with an adhesive solution leaked out as the first electrode pattern are coupled with the window substrate; and curing the first moisture prevention layer.

12. The method as set forth in claim 11, further comprising: after the attaching of the window substrate on the first transparent adhesive, attaching a hard-coating layer or an anti-reflection layer on the second transparent adhesive layer.

13. The method as set forth in claim 11, further comprising: after the forming of the first moisture prevention layer, forming a second moisture prevention layer over the first moisture prevention layer.

14. The method as set forth in claim 13, wherein, in the forming of the second moisture prevention layer, the second moisture prevention layer is formed of a different material from the first moisture prevention layer.

15. The method as set forth in claim 11, wherein, in the attaching of the window substrate on the first transparent adhesive layer, the first transparent adhesive layer is formed of optical clear adhesive (OCA), acryl based or epoxy based material.

* * * * *